United States Patent [19]

Kawiecki

[11] E Re. 29,391

[45] Reissued Sept. 6, 1977

[54] SURGE PROTECTOR ASSEMBLY

[75] Inventor: Chester J. Kawiecki, Santa Barbara, Calif.

[73] Assignee: Joslyn Mfg. and Supply Co., Chicago, Ill.

[21] Appl. No.: 308,294

[22] Filed: Nov. 20, 1972

Related U.S. Patent Documents

Reissue of:

[64] Patent No.: 3,543,207
Issued: Nov. 24, 1970
Appl. No.: 781,134
Filed: Dec. 4, 1968

[51] Int. Cl.[2] ..... H01H 79/00; H02H 3/22

[52] U.S. Cl. ..... 337/28; 361/120; 361/124

[58] Field of Search ..... 337/31-33, 337/161, 166, 186, 239; 317/61, 62, 66, 61.5

[56] References Cited

U.S. PATENT DOCUMENTS

| | | | |
|---|---|---|---|
| 2,365,517 | 12/1944 | Berkey | 361/120 |
| 3,268,693 | 8/1966 | Linton | 337/195 |
| 3,411,040 | 11/1968 | Dietz | 337/34 |

FOREIGN PATENT DOCUMENTS

| | | |
|---|---|---|
| 539,004 | 4/1957 | Canada |

*Primary Examiner*—Harold Broome
*Attorney, Agent, or Firm*—Klarquist, Sparkman, Campbell, Leigh, Hall & Whinston

[57] ABSTRACT

A surge protector assembly includes a unitary miniature surge protector having a pair of hollow electrode members extending within and sealed to a ceramic cylinder. The electrodes are provided with end walls which face one another within the cylinder to define a gap, and which are adapted to soften or melt under continuation of a predetermined arc discharge. Cylindrical contact members are slidably receivable within the electrodes and are spring-biased for urging the electrode end walls toward one another for shorting the gap, as, for example under extended breakdown conditions. The unitary surge protector and the contact members are received within a cylindrical holder having a spring means for urging the contact members toward the aforementioned end walls. The holder is threadedly received within a base member which makes electrical connection with the surge protector.

15 Claims, 4 Drawing Figures

FIG. 1
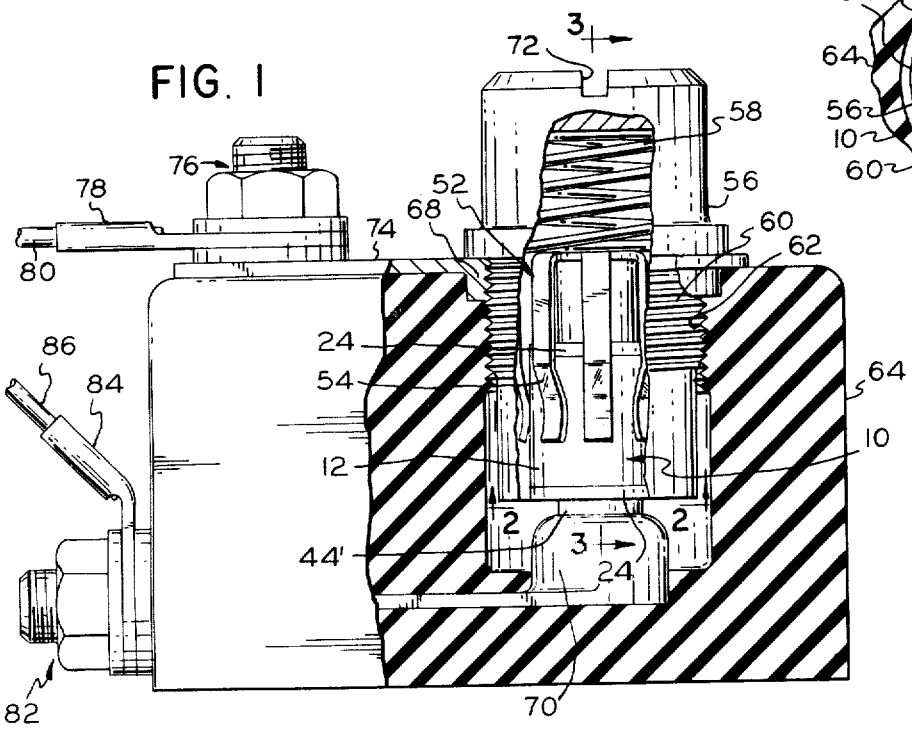
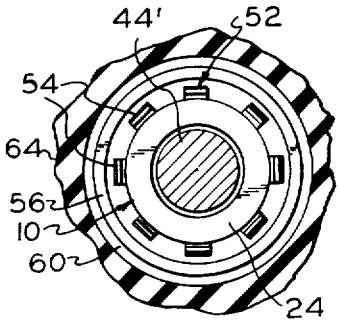
FIG. 2
FIG. 3
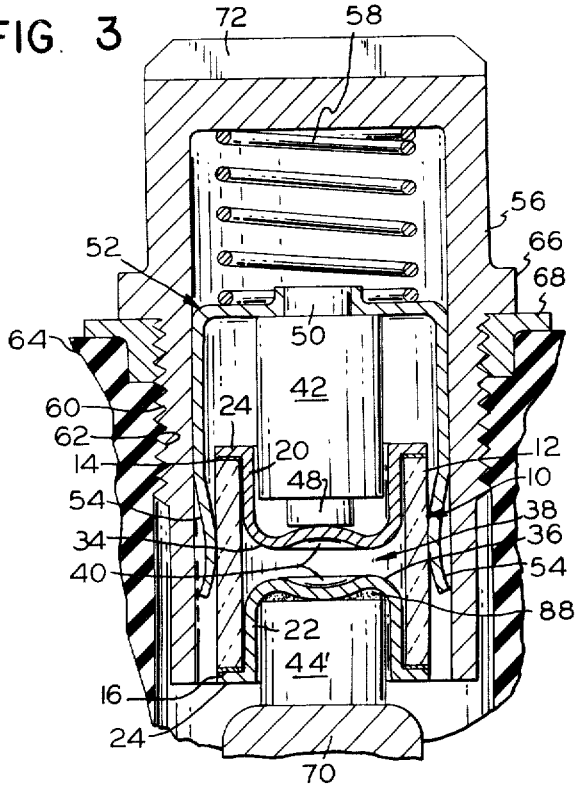
FIG. 4
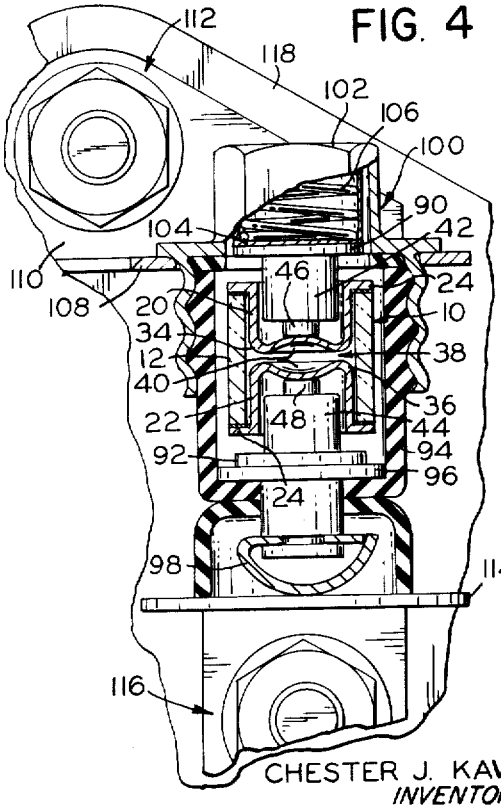
CHESTER J. KAWIECKI
INVENTOR
BY
BUCKHORN, BLORE, KLARQUIST & SPARKMAN
ATTORNEYS

SURGE PROTECTOR ASSEMBLY

Matter enclosed in heavy brackets [ ] appears in the original patent but forms no part of this reissue specification; matter printed in italics indicates the additions made by reissue.

CROSS-REFERENCE TO RELATED APPLICATION

This application is related to my copending application Ser. No. 684,706, filed Nov. 21, 1967, and entitled, "Surge Protector."

BACKGROUND OF THE INVENTION

Surge protector assemblies are usually fairly complex in construction involving a plurality of parts which must be assembled in the right order each time the surge protector device is replaced. These parts include spark-gap elements, holders, solder pellets, and the like and may provide fusing or fail-safe features. Frequently these devices as assembled do not have uniform operating characteristics, and moreover are apt to short out or fail under heavy current conditions before such action is desired. At the same time, operating characteristics are sometimes unpredictable, and the device may not fail safe or short out before the connecting conductors fail or vaporize.

SUMMARY OF THE INVENTION

According to the present invention, a unitary surge protector comprises hollow cylindrical members having closed end walls spaced from one another within a ceramic cylinder to form a gap. Cylindrical contact members are slidable within the outside ends of the electrode cylindrical members, whereby the electrode cylindrical members substantially longitudinally align the contact members. The surge protector with contact members is received within a cylindrical holder having a spring means for urging the contact members against respective electrode end walls, so that under predetermined arcing conditions, the contact members will force the electrode end walls together to provide a fail-safe feature. A base member threadedly receives and provides electrical connections for the device.

It is accordingly an object of the present invention to provide an improved surge protector assembly which is easy to assemble and replace after failure of a previous unit.

It is a further object of the present invention to provide an improved surge protector assembly having uniform and improved operating characteristics.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is an end view, partially broken away in cross section of a surge protector assembly according to the present invention;

FIG. 2 is a transverse cross section taken at 2—2 in FIG. 1;

FIG. 3 is a longitudinal cross section taken at 3—3 in FIG. 1; and

FIG. 4 is a cross section of an alternative embodiment of the present invention.

DETAILED DESCRIPTION

The assembly according to the present invention includes a surge protector of the type set forth in my aforementioned application Ser. No. 684,706, filed Nov. 21, 1967, entitled, "Surge Protector," and assigned to the assignee of the present invention.

Referring to the drawings, this surge protector 10 is suitably quite small, including cylindrical spacer tube 12, preferably taking the form of a ceramic tube approximately five-sixteenths inch in diameter and approximately five-sixteenths inch in length. In assembling the surge protector according to the present invention, the ends of the ceramic spacer cylinder 12 are suitably metalized, and brazing washers 14 and 16 which may be formed of copper or an alloy of copper and silver are located on the metalized ends. Then, thin walled, hollow, cylindrical electrodes 20 and 22, preferably formed of a nickel, iron, cobalt alloy having a coefficient of expansion compatible to that of alumina, are inserted into either end of the ceramic tube 12, each of these electrodes having an annular lateral flange 24 for making contact with brazing washers 14 and 16. The electrodes 20 and 22, which are substantially cylindrical, are flared outwardly at their rearward ends at the aforementioned flanges 24.

To secure electrodes 20 and 22 within spacer tube 12, the assembly of these components with brazing washers 14 and 16 in place is suitably raised in temperature to braze the assembly, with the interior of the envelope suitably being at least partially evacuated. The envelope may be provided with a gaseous environment at a given pressure. A unitary sealed surge protector is thereby formed, having desirable characteristics as described in my above referenced patent application. Electrodes 20 and 22 include end portions having respective end walls 34 and 36 which face one another and which define a gap 38 therebetween. The electrode end walls are slightly cup-shaped or indented where they face one another as indicated at 40.

The surge protector is provided with a pair of cylindrical contact members 42 or 44 (or 44') which are loosely slidably received within the hollow cylindrical electrodes 20 and 22. Thus, the contact members are not tightly received within the cylindrical electrodes, but are received closely enough whereby the cylindrical electrodes align the contact members in a direction substantially longitudinally or axially of the surge protector. Each contact member extends outwardly past flange 24. At least one of the contact members (and suitably both) is provided with smaller diameter end portion 46, or 48, for abutting electrode end walls 34 and 36, respectively. Specifically, the smaller diameter portions are adjacent indentations 40, on the convex side of the indentations. The diameter of portions 46 and 48 is similar in size to that of the aforementioned indentations, i.e. both desirably have substantially the same diameter. In the embodiment of FIG. 3 only one of the contact members, i.e. contact member 42, is provided with a reduced diameter portion 48, while contact member 44' directly engages the central indentation of end wall 36. The contact members are spring biased toward one another, as will hereinafter more fully appear, for causing electrode end walls to make contact under predetermined arcing conditions.

In the embodiment of FIGS. 1, 2, and 3, contact member 42 is provided at its upper end with an extension 50 for securing the contact member coaxially within an aperture in the end wall of a metal cage 52. Cage 52 is provided with fingers 54 which extend along and grip the sides of cylindrical tube 12. The cage 52 is also closely received within cylindrical metal holder 56, and a spring 58 is positioned inside holder 56 between the top thereof and the top of cage 52. Thus, spring 58, in compression, tends to urge cage 52 and contact member 42 against end wall 34 of electrode 20, with the surge protector 10 received in cage 52. The same spring pressure urges contact member 44' against end wall 46. Contact member 44' is desirably soldered to end wall 40 of electrode 22 as indicated at 88 in FIG. 3 to prevent loss of the contact member during assembly, it being understood that such solder melts under extended breakdown conditions freeing the contact member for longitudinal movement.

Holder 56 is externally threaded at 60 for engaging internal thread 62 in base member 64. Also, the holder 56 is provided with shoulder 66 just above threaded portion 60 whereby the holder may threadedly engage insulating base 64 and be drawn up with shoulder 66 bearing upon conducting collar 68 for providing an external electrical connection to contact member 42. The base also includes a lower contact 70 for centrally engaging and making connection with contact member 44'. Contact 70 is spaced at a distance below the top surface of base member 64 so that when cylindrical holder 56 is drawn up tight, spring 58 is compressed, causing both contact members 42 and 44' thus to bear against respective end walls of the electrodes. For convenience in threadedly engaging holder 56 into base member 64, the top or head of cylindrical holder 56 is provided with a slot 72.

A conducting plate or bus 74 extends along the top surface of base member 64 and terminates in a stud connection and nut 76 which secures a lug 78 to the base member. A wire 80, which may comprise the protected line, is clamped to lug 78. Similarly, a stud and nut connection 82 secures lug 84 to the base member, this stud making connection with contact 70, internally of base 64. A wire 86, joined to lug 84, is suitably connected to ground.

When a predetermined voltage level is reached across the surge protector, e.g. as a result of a high voltage transient on the line to be protected, the gap 38 breaks down into an arc discharge, thereby shorting out the high voltage transient, and protecting the equipment on the line. The occurrence of a short period discharge will not alter the operating characteristics of the surge protector and it will remain operative. However, an arc discharge for an extended period of time, for example carrying long duration currents, may melt the electrode end walls so that they fuse and short out the device, or may soften end walls 34 and 36. The pressure of spring 58 in the latter case will force contact members 42 and 44' towards one another. The reduced diameter portion 48, bearing against the top indented end wall, will force such indented end wall toward the opposite indented end wall, as contact member 44' forces the latter upwardly. Thus, each end wall by virtue of being indented has an area adjacent the opposite electrode permitting central distortion of the walls toward each other. The force of spring 58 will cause the electrode end walls to make substantially permanent contact after an extended or predetermined arc discharge, thereby providing a desired fail-safe feature. Thus, for an extended discharge which would tend to alter the characteristics of the device, the device will be permanently short-circuited, and therefore easily located and replaced. The gap will fail-safe in this manner within a predetermined time, but will not short out for every momentary discharge. The characteristics may be accurately predetermined. It is also observed that replacement of the shorted unit is accomplished by slidably withdrawing cage 52 carrying surge protector 10 and contact members 42 and 44' from holder 56, after holder 56 is unscrewed from base member 64. A replacement unit is easily inserted, and such replacement does not involve special skill on the part of maintenance personnel replacing the device.

FIG. 4 illustrates, partially broken away in cross section, an alternative embodiment of a surge protector assembly according to the present invention. In this embodiment, contact members 42 and 44 are provided with enlarged heads 90 and 92, respectively. The combination of the surge protector 10 and the contact members 42 and 44 is received within a cylindrical holder 94, formed of insulating material, this cylindrical holder having a first metal contact surface 96 at the lower end thereof communicating with a lower external spring contact 98. Cylindrical holder 94 is also provided with a metal cap 100 threadedly secured to cylindrical holder 94 and including a hollow hex-head portion 102. Hollow head portion 102 receives a spring retainer contact 104 within which is located a spring 106 which may be compressed between contact 104 and the top of head portion 102. When cap 100 is fully engaged upon cylindrical holder 94, spring 106 urges contact 104 downwardly against enlarged head 90 of contact member 42. Thus, smaller diameter portions 46 and 48 of contact members 42 and 44 respectively face the end walls of the surge protector providing pressure therebetween. Under predetermined conditions of prolonged arc breakdown, the surge protector operates in the same manner as hereinbefore described in connection with the first embodiment of the present invention to cause end walls 34 and 36 to make a permanent fail-safe contact. The spacing of heads 90 and 92 from flanges 24 must total a distance greater than the spacing of gap 38 (between electrode indentations) so that the electrodes may make contact.

The cap 100 is also threaded on its exterior periphery and is threadedly engaged into an aperture in connector ring 108 extending from a connector plate 110. Connector plate 110 supports a stud and nut combination 112 which may be connected to a line being protected. With cap 100 threadedly engaging ring 108, spring contact 98 is compressed against metal plate 114 to which stud and nut arrangement 116 are secured. The latter combination is suitably connected to ground by means not shown. Both the plate 110 and the plate 114 form part of a common base member 118.

In the embodiment of FIG. 4, as in the previous embodiment, replacement of the surge protector involves removal of the cylindrical holder 94 and cap 100 from ring 108, by unscrewing the cap and holder from ring 108, followed by removal of cap 100 from holder 94 by unscrewing the two. The surge protector 10 together with contact members 42 and 44 is then easily replaced without requiring special skill or reassembly of a gap device by maintenance personnel.

I claim:

1. A surge protector assembly comprising:

a unitary surge protector including a pair of aligned conductive electrodes each comprising a hollow cylindrical member having a first closed end wall with the opposite end being open and flared to provide an annular flange, and a ceramic spacer cylinder sealed between the flanges of said electrodes for positioning said electrode end walls in facing relation internally of said cylinder forming an arc discharge gap therebetween, said spacer cylinder forming an enclosure with said electrodes, elongated contact members within each said hollow cylindrical member and bearing on the inside of the electrode end wall in the direction of the opposite electrode, said contact members each extending outwardly past the electrode's annular flange, a cylindrical holder within which said protector is received in substantially coaxial relation with respect to said holder, said holder being provided with a spring at one end thereof bringing pressure against one of said contact members urging the same against its corresponding electrode end wall, and a base member receiving said holder, said base member being provided with means for matingly engaging the exterior of said holder in supporting relation, and for providing outside electrical connection for said contact members.

2. The assembly according to claim 1 wherein each of said contact members is substantially cylindrical and loosely slidably received within a hollow cylindrical member for longitudinal alignment of said contact members relative to said surge protector and said cylindrical holder by a said hollow cylindrical member.

3. The assembly according to claim 1 wherein each of said electrode end walls is centrally indented from said gap, with said contact members bearing on the opposite sides of said indentations.

4. The assembly according to claim 3 wherein each of said contact members is substantially cylindrical having a first diameter less than the inside diameter of said hollow cylindrical members, said contact members being loosely slidably received within said hollow cylindrical members, and at least one contact member having a length adjacent an end wall indentation which is of smaller diameter being comparable to the size of said indentation, said one contact member bearing thereagainst and forcing said end walls together under conditions of predetermined arc discharge across said gap.

5. The assembly according to claim 2 wherein said contact members are each provided with enlarged heads at the point where said contact members extend beyond said electrode flanges, the spacing of said heads from said flanges totaling a distance greater than the spacing of said gap.

6. The assembly according to claim 5 wherein said cylindrical holder is formed of insulating material having a first contact at one end for making connection with the head of one of said contact members and having a metal cap threadedly received on the other end wherein said cap includes a second contact biased by said spring against the head of the remaining contact member, said means for providing outside electrical connection including means for making connection with said cap and with said first contact as said cylindrical holder is threadedly received in said base member.

7. The assembly according to claim 2 further including a conductive cage longitudinally received in said holder against the pressure of said spring, said cage coaxially supporting a first of said contact members and also having spring fingers grasping the outside of said spacer cylinder received therewithin, said cylindrical holder being metal and having external threads engageable with a said base member.

8. The assembly according to claim 7 wherein the second of the contact members is soldered to its corresponding electrode.

9. A surge protector assembly comprising:

a unitary surge protector including a pair of aligned conductive electrodes each comprising a hollow cylindrical member having a first closed end wall with the opposite end being open and flared outwardly to provide an annular flange, and a ceramic spacer cylinder sealed between the flanges of said electrodes for positioning the electrode end walls in facing relation interiorly of said cylinder forming an arc discharge gap therebetween, said end walls being indented from said gap, wherein said spacer cylinder forms an enclosure together with said electrodes within which a given pressure is maintained, elongated cylindrical contact members loosely slidably received within said hollow cylindrical member for alignment longitudinally of said surge protector by said hollow cylindrical members, at least one of said contact members having a short length adjacent an end wall indentation which is of smaller diameter being comparable in size to the indentation for bearing thereagainst, each contact member extending outwardly past the electrode's annular flanges, and each contact member having an enlarged head at a distance beyond a corresponding electrode flange wherein the combined spacing of the heads from the flanges totals a distance greater than the spacing of the gap between indentations, a cylindrical holder formed of insulating material for longitudinally receiving said surge protector and said contact members, said cylindrical holder having a first contact at one end for making connection with the head of one of said contact members and having a metal cap threadedly received on the other end of the holder wherein said cap includes a second contact spring-biased against the head of the remaining contact member, and a base member comprising a first plate threadedly receiving said cap and making electrical contact therewith, said base member further including a second plate for making electrical connection with said first contact.

10. A surge protector assembly comprising:

a unitary surge protector including a pair of aligned conductive electrodes each comprising a hollow cylindrical member having a first closed end wall with the opposite end being open and flared outwardly to provide an annular flange, and a ceramic spacer cylinder sealed between the flanges of said electrodes for positioning the electrode end walls in facing relation interiorly of said cylinder forming an arc discharge gap therebetween, said end walls being indented from said gap, wherein said spacer cylinder forms an enclosure together with said electrodes within which a given pressure is maintained, first and second elongated cylindrical contact members loosely slidably received within said hollow cylindrical members and being aligned longitudinally of said surge protector by said hollow cylindrical members, at least one of said contact members having a short length adjacent an end wall indentation which is of smaller diameter being comparable in size to the indentation and bearing thereagainst, each contact member extending outwardly [pass] *past* the electrode's annular flanges, a cylindrical holder formed of conductive material for longitudinally receiving said surge protector and said contact members, a conductive cage longitudinally received in said holder, said cage coaxially supporting a first of said contact members and also having spring fingers grasping the outside of said spacer cylinder received therewithin, and a spring between said cage and a first closed end of said cylindrical holder, the second end of said cylindrical holder being open, and a base member threadedly receiving said holder and provided with electrical connecting means for making contact with the exterior of said holder, said base member also having a contact for making connection with the second contact member when said holder is threadedly engaged with said base.

11. A surge protector assembly comprising:

a unitary surge protector including a pair of aligned conductive electrodes each comprising a hollow cylindrical member having a first closed end wall with the opposite end being open and flared to provide an annular flange, and a ceramic spacer cylinder sealed between the flanges of said electrodes for positioning said electrode end walls in facing relation internally of said cylinder forming an arc discharge *gap* therebetween, said spacer cylinder forming an enclosure with said electrodes, elongated cylindrical contact members slidably received within each said hollow cylindrical member, and bearing on the inside of the electrode end wall in the direction of the opposite electrode, said contact members each extending outwardly past the electrode's annular flange, and a conductive cage coaxially supporting a first of said contact members at one end of said cage and said first contact member, said cage also having spring fingers receiving and grasping the outside of said spacer cylinder received therewithin, said cage extending longitudinally part way along said spacer cylinder.

12. The [asembly] *assembly* according to claim 11 wherein the second contact member is soldered to its corresponding electrode.

*13. An over voltage arrester comprising:*

*a tubular insulating member,*

*a pair of electrodes mounted in a gastight manner in said tubular member and each having an electrode surface spaced apart from a corresponding electrode surface of the other electrode,*

*said electrodes each comprising a hollow member having a closed end wall with the opposite end being open and flared to provide a flange sealed to one end of said tubular member,*

*contact blocks formed of good thermal conducting material and being thermally coupled to respective ones of said electrodes conducting away heat therefrom during operation of the voltage arrester,*

*said electrodes facing oppositely of each other, and having their closed ends positioned inwardly from the ends of said tubular member, and*

*means urging the electrodes inwardly of said tubular insulating member.*

*14. An over voltage arrester in accordance with claim 13 wherein at least one of said contact blocks is firmly secured to a said electrode.*

*15. A surge protector assembly comprising:*

*a unitary surge protector including a pair of aligned conductive electrodes each comprising a hollow member having a first closed end wall with the opposite end being open and flared to provide a flange, and a ceramic spacer cylinder sealed between the flanges of said electrodes for positioning said electrode end walls in facing relation internally of said cylinder forming an arc discharge gap therebetween, said spacer cylinder forming an enclosure with said electrodes,*

*contact means for each said hollow member and bearing thereon in the direction of the opposite electrode, said contact means each extending outwardly past the electrode's annular flange, and at least one of said contact means extending inside the electrode,*

*a holder within which said protector is received in substantially coaxial relation with respect to said holder, said holder being provided with a spring at one end thereof bringing pressure against one of said contact means urging the same toward the other, and means for engaging the other of said contact means and providing for outside electrical connection for said contact means.*

* * * * *